(12) United States Patent
Johnston et al.

(10) Patent No.: US 12,449,304 B2
(45) Date of Patent: Oct. 21, 2025

(54) SPECTROPHOTOMETRIC INSTRUMENT

(71) Applicant: Palintest Limited, Gateshead (GB)

(72) Inventors: Simon Richard Johnston, Chollerton (GB); Kevin McDermott, Newcastle-Upon-Tyne (GB); Michal Lukasz Jankowski, Durham (GB); Matthew David Stebbings, Gateshead (GB)

(73) Assignee: Palintest Limited, Gateshead (GB)

( * ) Notice: Subject to any disclaimer, the term of this patent is extended or adjusted under 35 U.S.C. 154(b) by 222 days.

(21) Appl. No.: 18/271,910

(22) PCT Filed: Jan. 5, 2022

(86) PCT No.: PCT/EP2022/050143
§ 371 (c)(1),
(2) Date: Jul. 12, 2023

(87) PCT Pub. No.: WO2022/152607
PCT Pub. Date: Jul. 21, 2022

(65) Prior Publication Data
US 2024/0077357 A1    Mar. 7, 2024

(30) Foreign Application Priority Data
Jan. 12, 2021 (GB) ................. 2100347

(51) Int. Cl.
*G01J 3/02* (2006.01)
(52) U.S. Cl.
CPC ........... *G01J 3/0291* (2013.01); *G01J 3/0267* (2013.01)

(58) Field of Classification Search
CPC .............. G01J 3/0267; G01J 3/0291; G01N 2021/0367; G01N 21/01; G01N 21/0303; G01N 2201/021; G01N 2201/0245; G01N 2201/064
See application file for complete search history.

(56) References Cited

U.S. PATENT DOCUMENTS

| 3,695,772 | A | * | 10/1972 | Spyropoulos | G01N 21/03 356/246 |
|---|---|---|---|---|---|
| 5,013,155 | A | | 5/1991 | Rybak | |
| 5,872,361 | A | * | 2/1999 | Paoli | G01N 21/534 250/341.8 |
| 2015/0198521 | A1 | * | 7/2015 | Moldt | G01N 21/05 356/246 |
| 2016/0238542 | A1 | | 8/2016 | Wiener et al. | |
| 2016/0299075 | A1 | | 10/2016 | Willuweit et al. | |
| 2024/0010961 | A1 | * | 1/2024 | Soragni | C12M 35/08 |

FOREIGN PATENT DOCUMENTS

| JP | H09243553 A | 9/1997 |
|---|---|---|
| KR | 100691581 B1 | 3/2007 |
| WO | 2000064242 A1 | 11/2000 |

* cited by examiner

*Primary Examiner* — Hina F Ayub
(74) *Attorney, Agent, or Firm* — KIRTON McCONKIE; Evan R. Witt

(57) ABSTRACT

A spectrophotometric instrument (1) for the quantitative measurement of an optical property of an analyte in a sample cell (4). The spectrophotometric instrument (1) comprises an instrument housing (2a, 2b) for a source of electromagnetic radiation and a detector; an optical pot (3) for accommodating the sample cell (4) having a flexible restraining cradle (6).

11 Claims, 3 Drawing Sheets

SPECTROPHOTOMETRIC INSTRUMENT

The present invention relates to a spectrophotometric instrument.

The positioning of a sample cell in a light path is critical to the repeatability and accuracy of spectrophotometric measurements. Movement of the sample cell during measurement or adjustment of the position of the sample cell between measurements will cause unwanted deviations in the observed results.

A sample cell is typically cylindrical (eg a sample tube) and its diameter may have a manufacturing tolerance. For example, the diameter may be 25.25 mm+/−0.2 mm.

This tolerance is the largest dimensional variable in the spectrophotometric instrument and has the greatest impact on the ability to provide an accurate measurement.

The present invention seeks to improve the performance of a spectrophotometric instrument by flexibly accommodating the sample cell.

Thus viewed from a first aspect the present invention provides a spectrophotometric instrument for the quantitative measurement of an optical property of an analyte in a sample cell at one or more wavelengths, wherein the spectrophotometric instrument comprises:

an instrument housing which houses a source of electromagnetic radiation and a detector between which in use the electromagnetic radiation passes along an optical path;

an optical pot for accommodating the sample cell in the optical path, wherein the optical pot is seated inside the instrument housing; and a flexible restraining cradle mounted circumferentially on the optical pot in sealing engagement with the instrument housing, wherein the flexible restraining cradle is adapted to restrainedly accommodate the sample cell in the optical path.

The flexible restraining cradle serves to ensure alignment between the sample cell, the optical pot and the instrument housing, whilst providing a seal to ensure that the instrument housing is waterproof. The flexibility of the restraining cradle provides optimal tolerance of sample cell dimensions whilst ensuring repeatable measurements.

The flexible restraining cradle may be moulded from a thermoplastic elastomer (TPE). The TPE may be black. The shore hardness of the TPE may be optimised to ensure loading and unloading of the sample cell without excessive friction.

Preferably the optical pot is optically transparent. The optical pot may be (for example) formed from polymethylmethacrylate (PMMA).

Preferably the flexible restraining cradle is overmoulded onto the optical pot. Overmoulding in the same tool improves consistency of component parts and therefore reduces variability in optical performance between instruments.

The flexible restraining cradle and optical pot may be co-moulded.

Preferably the flexible restraining cradle comprises:

an annular collar fitted to the mouth (eg the upper rim) of the optical pot.

Preferably the annular collar is at least partly reentrant to encapsulate the upper rim of the optical pot.

The outer wall of the annular collar may be ribbed. A plurality of ribs in the outer wall of the annular collar may interlock with a plurality of sockets in the upper rim of the optical pot.

Interlocking features may fix the instrument housing around the optical pot. This ensures that the key optical components housed within the instrument housing are fixed in orientation and position around the optical pot. Having a single reference feature for the instrument (the optical pot) limits the dimensional freedom of the instrument and improves the overall performance.

Preferably the flexible restraining cradle comprises:

a plurality of spaced apart pillars, wherein each pillar extends axially along the inner wall of the annular collar and beyond adjacent to a longitudinal section of the interior wall of the optical pot.

The plurality of spaced apart pillars may be substantially parallel.

The plurality of pillars may be spaced apart substantially equidistantly. For example, three pillars may be spaced apart at about 120 degrees. This serves advantageously to centralise the sample cell accommodated in the optical pot.

The plurality of spaced apart pillars may act usefully as an optical barrier to limit stray electromagnetic radiation and internal reflections.

Preferably each pillar extends through an aperture in the floor of the optical pot to form a foot. Particularly preferably each foot stands on a surface (eg the base) of the instrument housing to form a compression pad. The compression pad contributes advantageously to the waterproof seal between the optical pot and the instrument housing.

Each foot may be an inwardly-pointing foot.

Preferably the longitudinal section of the interior wall of the optical pot is a hollowed channel. The hollowed channel facilitates compression of the pillars when a large diameter sample cell is used (eg a sample cell with a diameter of 25.45 mm) and mitigates the friction between the sample cell and pillar during loading or unloading. The hollowed channels and pillars act as optical barriers to limit stray reflection of electromagnetic radiation within the optical pot and to limit internal reflection around the interior wall of the optical pot and from the sample cell.

Preferably the annular collar is equipped with a compression slot to the rear of each pillar.

Preferably each pillar is configured with a plurality of spaced apart contact interference surfaces (eg contact interference points). The plurality of contact interference surfaces may be spaced apart by non-contact surfaces. The plurality of contact interference surfaces may be spaced apart by a non-smooth (eg scalloped or textured) surface.

The contact interference surfaces serve to minimise frictional contact between the pillar and the sample cell which aids loading and unloading.

Preferably each contact interference surface is a raised ledge.

Preferably the plurality of contact interference surfaces is a pair of contact interference surfaces spaced apart at or near to the ends of the pillar. This helps to maintain the sample cell in a vertical orientation.

Preferably the flexible restraining cradle comprises:

a plurality of spaced apart end stops extending axially along the inner wall of the annular collar.

The plurality of end stops may be spaced apart substantially equidistantly. For example, three end stops may be spaced apart at 120 degrees. This serves advantageously to centralise the sample cell accommodated in the optical pot.

In a preferred embodiment, the plurality of end stops and the plurality of pillars are mutually spaced apart. Preferably the plurality of end stops and the plurality of pillars are mutually spaced apart substantially equidistantly. This serves to prevent angular displacement of the sample cell during loading and to limit the movement of the sample cell when the spectrophotometric instrument is disturbed.

Typically each of the plurality of end stops is shorter than each of the plurality of pillars. In an embodiment, the plurality of end stops is not in contact with the sample cell during normal use. This avoids additional friction on the sample cell during loading and unloading.

Preferably each end stop is a raised ledge.

The sealing engagement between the flexible restraining cradle and the instrument housing may be two dimensional. There may be a direct compression seal between the flexible restraining cradle and an upper part of the housing. There may be a sliding seal above the compression seal by pushing the optical pot and the associated printed circuit board assembly onto the instrument lid.

Preferably the distal end face of the annular collar includes a peripheral radiused lip whereby the distal end face has a substantially planar abutment surface to abut the instrument housing and a non-planar (eg rounded) sliding surface to slidably receive the instrument housing.

The instrument housing may house a filter upstream from the detector in the optical path. The filter is typically a narrow band pass filter.

The detector may be a spectrophotometer that measures the intensity of the electromagnetic radiation at the one or more wavelengths. The electromagnetic radiation may be x-ray, ultraviolet, visible, infrared or microwave radiation.

The optical property may be absorbance, reflectance or transmittance.

Typically the instrument housing additionally houses optics to deliver and collect the electromagnetic radiation.

The spectrophotometric instrument may further comprise a selectively detachable lid. The detachable lid may be fitted to the instrument housing over the mouth of the sample cell.

The present invention will now be described in a non-limitative sense with reference to embodiments and Figures in which.

Figure 1:
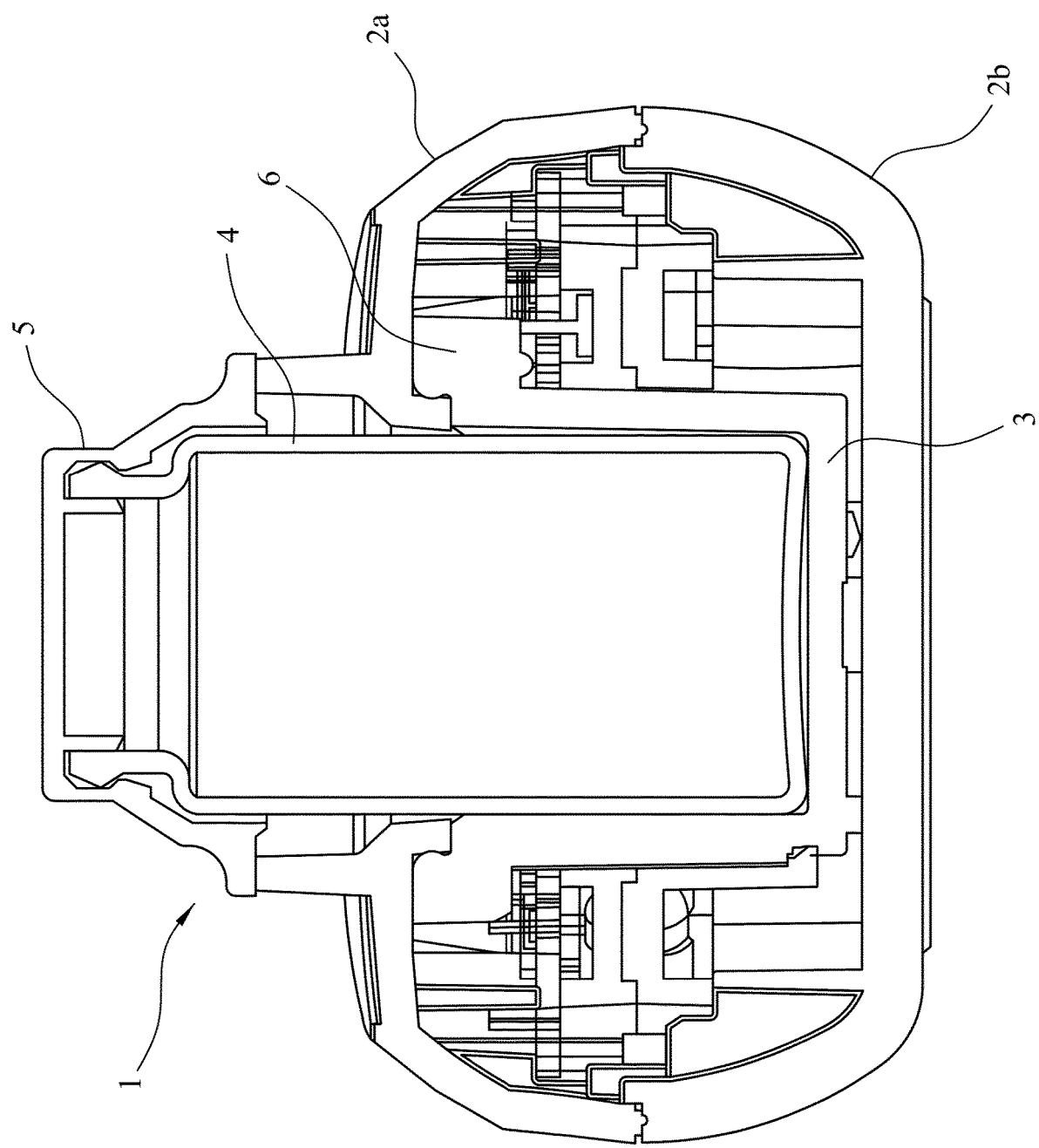
FIG. 1 is a schematic cross-sectional illustration of an embodiment of the spectrophotometric instrument of the invention.

FIG. 1 is a schematic cross-sectional illustration of an embodiment of the spectrophotometric instrument of the invention designated generally by reference numeral 1. The spectrophotometric instrument 1 comprises an upper instrument housing 2a and a lower instrument housing 2b which houses a source of electromagnetic radiation, a detector, a narrow band pass filter and optics (not shown). Interlocking features fix the lower instrument housing 2b around the optical pot 3 to fix the orientation and position of the key optical components.

An optical pot 3 made of PMMA is seated inside the instrument housing 2a, 2b and accommodates a sample cell 4. The upper instrument housing 2a is fitted with a detachable lid 5 over the mouth of the sample cell 4.

The spectrophotometric instrument 1 further comprises a flexible restraining cradle 6 overmoulded onto the optical pot 3 at its circumference. The flexible restraining cradle 6 is made of black TPE with a shore hardness of 74 and seals with the upper instrument housing 2a.

Figure 2:
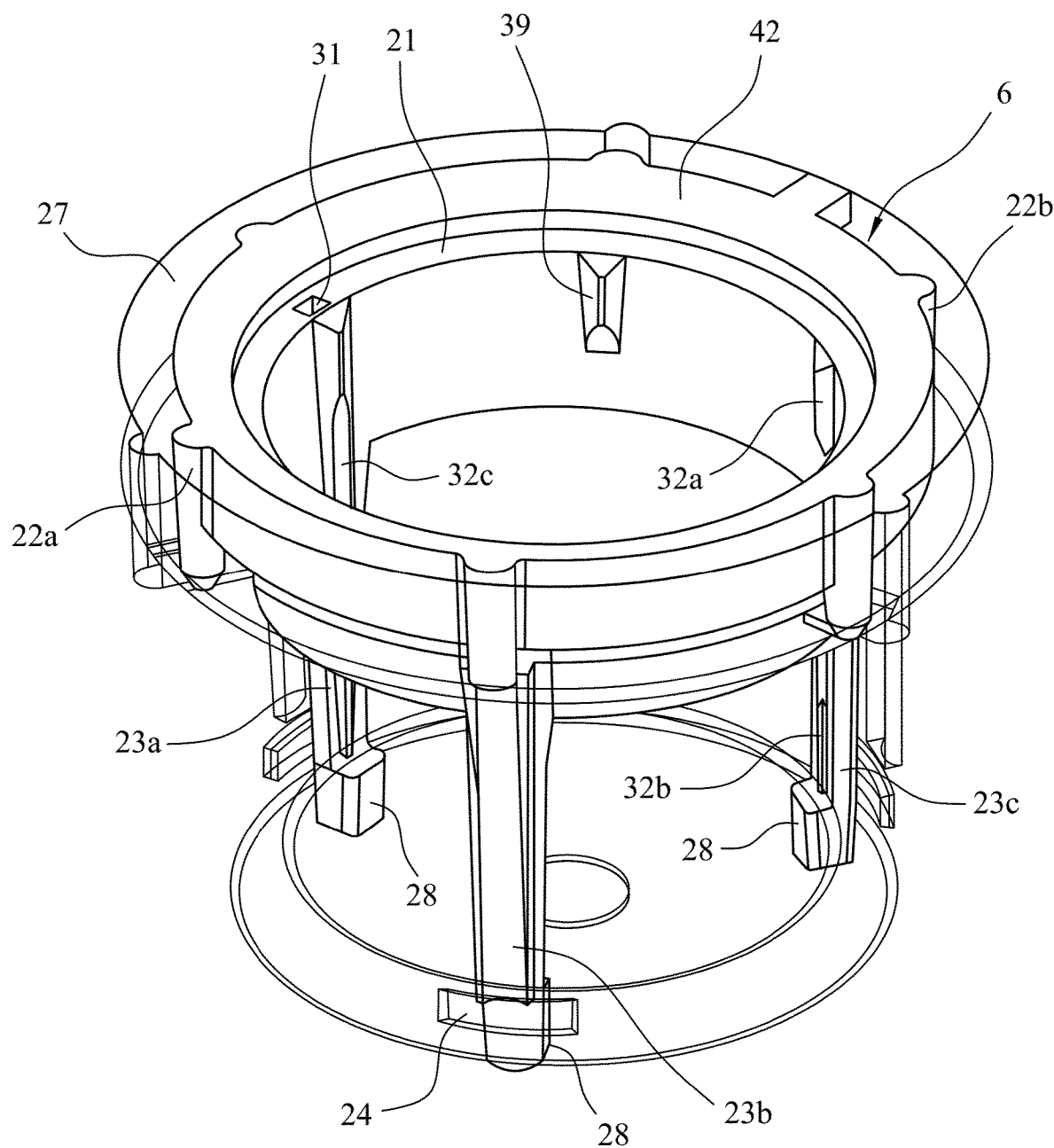
FIG. 2 is an exposed perspective view of the optical pot and flexible restraining cradle of the embodiment of FIG. 1.
Figure 3:
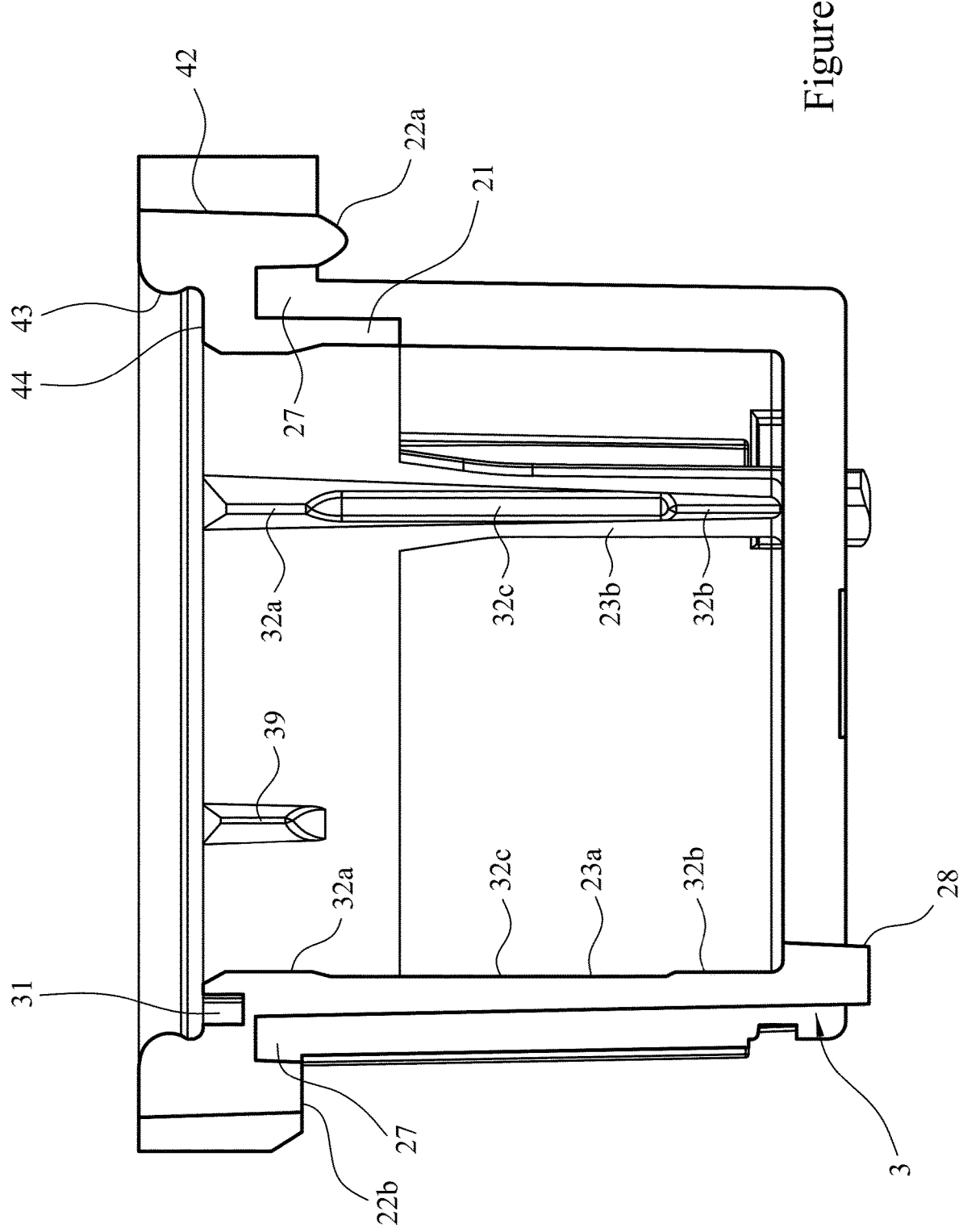
FIG. 3 is a cross-sectional view of the flexible restraining cradle of FIG. 2.

FIGS. 2 and 3 are exposed perspective and cross-sectional views respectively of the optical pot 3 and flexible restraining cradle 6 of the embodiment of FIG. 1. The flexible restraining cradle 6 comprises an annular collar 21 fitted to the mouth of the optical pot 3. As shown in cross-section in FIG. 3, the annular collar 21 is reentrant to encapsulate the upper rim 27 of the optical pot 3. The outer wall of the annular collar 21 includes a plurality of ribs 22a, 22b which interlock with a plurality of sockets in the upper rim 27 of the optical pot 3.

The flexible restraining cradle 6 further comprises three equidistantly spaced apart, parallel pillars 23a, 23b, 23c. Each pillar 23a, 23b, 23c extends axially along the inner wall of the annular collar 21 and beyond the inner wall adjacent to a longitudinal section of the interior wall of the optical pot 3. The longitudinal section of the interior wall of the optical pot 3 is a hollowed compression channel into which is inserted the pillar 23a, 23b, 23c.

The annular collar 21 is equipped with a compression slot 31 to the rear of each pillar 23a, 23b, 23c. Each pillar 23a, 23b, 23c extends through an aperture in the floor of the optical pot 3 to form a foot 28 which stands on a surface of the lower instrument housing 2b to form a compression pad. A location slot 24 in the optical pot 3 fixedly engages with the lower instrument housing 2b and together with the pillars 23a, 23b, 23c limits the rotational freedom of the optical pot 3.

Each pillar 23a, 23b, 23c is configured with a pair of contact interference points 32a, 32b in the form of a raised ledge spaced apart at opposite ends by a smooth non-contact surface 32c.

The flexible restraining cradle 6 further comprises three equidistantly spaced apart end stops 39 extending axially along the inner wall of the annular collar 21. The end stops 39 and the pillars 23a, 23b, 23c are mutually spaced apart equidistantly. Each of the end stops 39 is a raised ledge which is shorter than the raised ledge 32a, 32b of each pillar 23a, 23b, 23c. In normal use, the end stops 39 are not in contact with the sample cell 4.

The distal end face of the annular collar 21 includes a peripheral radiused lip 42 which delineates a planar abutment surface 44 to abut the upper instrument housing 2a and form a compression seal and a rounded surface 43 which forms a sliding seal with the upper instrument housing 2a.

The invention claimed is:

1. A spectrophotometric instrument for the quantitative measurement of an optical property of an analyte in a sample cell at one or more wavelengths, wherein the spectrophotometric instrument comprises:
   an instrument housing which houses a source of electromagnetic radiation and a detector between which in use the electromagnetic radiation passes along an optical path;
   an optical pot for accommodating the sample cell in the optical path, wherein the optical pot is seated inside the instrument housing; and
   a flexible restraining cradle mounted circumferentially on the optical pot in sealing engagement with the instrument housing, wherein the flexible restraining cradle is adapted to restrainedly accommodate the sample cell in the optical path, the flexible restraining cradle comprising:
      an annular collar fitted to the mouth of the optical pot, the annular collar being at least partly reentrant to encapsulate the upper rim of the optical pot;
      a plurality of spaced apart pillars, each pillar extending axially along and axially beyond the inner wall of the annular collar adjacent to a longitudinal section of the interior wall of the optical pot; and wherein each pillar extends through an aperture in the floor of the optical pot to form a foot.

2. A spectrophotometric instrument as claimed in claim 1 wherein the flexible restraining cradle is overmoulded onto the optical pot.

3. A spectrophotometric instrument as claimed in claim 1 wherein each foot stands on a surface of the instrument housing to form a compression pad.

4. A spectrophotometric instrument as claimed in claim 1 wherein the longitudinal section of the interior wall of the optical pot is a hollowed channel.

5. A spectrophotometric instrument as claimed in claim 1 wherein the annular collar is equipped with a compression slot to the rear of each pillar.

6. A spectrophotometric instrument as claimed in claim 1 wherein each pillar is configured with a plurality of spaced apart contact interference surfaces.

7. A spectrophotometric instrument as claimed in claim 6 wherein the plurality of contact interference surfaces is a pair of contact interference surfaces spaced apart at or near to the ends of the pillar.

8. A spectrophotometric instrument as claimed in claim 6 wherein each contact interference surface is a raised ledge.

9. A spectrophotometric instrument as claimed in claim 1 wherein the flexible restraining cradle comprises:
   a plurality of spaced apart end stops extending axially along the inner wall of the annular collar.

10. A spectrophotometric instrument as claimed in claim 9 wherein the plurality of end stops and the plurality of pillars are mutually spaced apart substantially equidistantly.

11. A spectrophotometric instrument as claimed in claim 1 wherein the distal end face of the annular collar includes a peripheral radiused lip whereby the distal end face has a substantially planar abutment surface to abut the instrument housing and a non-planar sliding surface to slidably receive the instrument housing.

* * * * *